United States Patent [19]
Takamiya et al.

[11] Patent Number: 5,370,411
[45] Date of Patent: Dec. 6, 1994

[54] BICYCLE FRAME ASSEMBLY

[75] Inventors: Kikuzo Takamiya, Kitamoto; Nobuaki Shimada; Akira Dohi, both of Ageo; Kazuyoshi Eshima, Yokohama, all of Japan

[73] Assignee: Bridgestone Cycle Co., Ltd., Japan

[21] Appl. No.: 959,912

[22] Filed: Oct. 13, 1992

[30] Foreign Application Priority Data

Oct. 14, 1991 [JP] Japan ................. 3-264506
May 21, 1992 [JP] Japan ................. 4-154339

[51] Int. Cl.⁵ .............................. B62K 25/20
[52] U.S. Cl. .......................... 280/284; 267/33
[58] Field of Search ......... 280/284, 276, 279, 288; 267/169, 178, 179, 33, 287

[56] References Cited

U.S. PATENT DOCUMENTS

| | | | |
|---|---|---|---|
| 625,456 | 5/1899 | Mills | 280/284 |
| 657,667 | 9/1900 | Mills | 280/284 |
| 2,223,187 | 11/1940 | Schleicher | 280/284 |
| 2,446,731 | 10/1948 | Wheler | 280/284 |
| 2,469,596 | 5/1949 | Groom | 267/33 |
| 3,178,036 | 4/1965 | Cardwell | 267/33 |
| 3,208,767 | 9/1965 | Moulton | 267/33 X |
| 3,974,892 | 10/1976 | Bolger | 280/284 X |
| 4,046,396 | 9/1977 | Taylor et al. | 280/284 X |
| 4,886,255 | 12/1989 | Paton | 267/33 X |

FOREIGN PATENT DOCUMENTS

| | | | |
|---|---|---|---|
| 403158 | of 1934 | Belgium | . |
| 723467 | 4/1932 | France | . |
| 0972772 | 4/1941 | France | 280/284 |
| 1938220 | 2/1971 | Germany | . |
| 51-31437 | 3/1976 | Japan | . |
| 53-101650 | 8/1978 | Japan | . |
| 54-156352 | 10/1979 | Japan | . |
| 0004586 | 10/1895 | Norway | 280/284 |
| 111129 | 11/1917 | United Kingdom | . |
| 497008 | 12/1938 | United Kingdom | . |
| 671798 | 5/1952 | United Kingdom | . |
| 844750 | 8/1960 | United Kingdom | . |
| 1066193 | 4/1967 | United Kingdom | . |

*Primary Examiner*—Kenneth R. Rice
*Assistant Examiner*—F. Zeender
*Attorney, Agent, or Firm*—Parkhurst, Wendel & Rossi

[57] ABSTRACT

A bicycle frame assembly including a shock absorbing system associated with a rear wheel. The frame assembly comprises a main frame section, chain stays, seat stays and a rocker arm element, which are combined with each other to form a four-link mechanism that is movable within a vertical plane including the main frame section. A shock absorbing device is arranged between the rocker arm element and the main frame body, for absorbing shocks transmitted from the rear wheel to the main frame section when the frame assembly is in use.

36 Claims, 11 Drawing Sheets

FIG_1

FIG_2

FIG_3

FIG_4

FIG_5

FIG_6

FIG_9

BICYCLE FRAME ASSEMBLY

BACKGROUND OF THE INVENTION

1. Field of the Invention

The present invention relates to a bicycle frame assembly with a main frame section and a shock absorbing system for absorbing shocks transmitted from a rear wheel to the main frame section.

2. Description of the Prior Art

This type of bicycle frame assembly is disclosed, for example, in Japanese Patent Unexamined Publication No. 51-31,437 and Japanese Utility Model Unexamined Publication Nos. 53-101,650 and 54-156,352. The prior art frame assembly known from these publications includes a main frame section which is generally formed of a head tube, a top tube, a down tube and a seat tube. The frame assembly further includes a pair of chain stays and a pair of seat stays, wherein the chain stays are pivotally connected to the main frame section adjacent to the bottom bracket at the lower end of the seat tube. On each side of the rear wheel, the chain stay at its rear end and the seat stay at its lower end are integrally and rigidly connected with each other to form a rear frame section. A shock absorbing device is connected between the upper end of the seat stay and the main frame section.

The rear frame section of the aforementioned known frame assembly is positively secured by a pivotal connection to the main frame section only adjacent to the bottom bracket, so that the frame assembly as a whole lacks in sufficient transverse rigidity. As known in the art, a bicycle frame assembly with a poor rigidity undergoes increased bending and/or twisting deformation in actual use condition of the bicycle. This results in serious disadvantages, such as increased power loss in term of the pedal depression force and increased rolling resistance of tires, due to dislocation of front and rear wheels out of a common plane, as well as enhanced difficulties in steering the front wheel by operating a handle bar, and also in maintaining a stabilized driving posture of the cyclist-bicycle system, etc.

Moreover, conventional shock absorbing devices used for the rear wheel shock absorbing system of a bicycle frame assembly encounter various problems.

For example, coil spring has been widely used as the shock absorbing device, which does not essentially achieve a damping effect by itself and tends to deteriorate a stable riding comfort due to a poor convergence of input vibration. The coil spring is generally designed to have a relatively high fixed spring constant which is primarily determined to achieve an intended shock absorbing function when applied with a heavy load, e.g. during driving on a rough road or off-road land surface. This means that the coil spring cannot absorb light shocks arising from a small amplitude vibration during a normal driving on a relatively smooth road surface. Further, the fixed spring constant of the coil spring makes it difficult to optimize the shock absorbing system in terms of cyclist's weight and posture and/or running surface condition which changes from time to time.

An alternate type of the rear wheel shock absorbing system for a bicycle frame assembly employs a shock absorber which is similar to those used for motorcycles. The shock absorber has a basic arrangement wherein a piston and a spring are combined with a cylinder, and allows the spring constant and damping characteristics to be determined within a wide range. However, due to the above-mentioned basic arrangement, the shock absorber not only requires maintenance, but also is generally complex in structure, heavy in weight and costly. Moreover, this this of shock absorber does not always provide a sufficient piston stroke per unit volume, as required particularly for heavy duty bicycles.

SUMMARY OF THE INVENTION

It is therefore a primary object of the present invention to provide an improved bicycle frame assembly which incorporates a shock absorbing system associated with a rear wheel, and which eliminates or at least mitigates the above-mentioned drawbacks of the prior art.

It is a more specific object of the present invention to provide an improved bicycle frame assembly which incorporates a shock absorbing system associated with a rear wheel, and which yet provides a sufficient transverse rigidity to minimize bending or twisting deformation of the assembly.

It is another object of the present invention to provide a bicycle frame assembly with a novel shock absorbing device which is effective under both light and heavy load conditions and which is yet simple in structure, light in weight, less costly and maintenance-free.

According to the present invention, there is provided a bicycle frame assembly including a shock absorbing system associated with a rear wheel, which comprises a main frame section, first and second chain stays each having a front end and a rear end, the front end being associated with the main frame section in a first region, first and second seat stays each having an upper end and a lower end, the upper end being associated with the main frame section in a second region above the first region, first and second fork end elements for mounting and supporting the rear wheel, the first fork end element being arranged on one side of the rear wheel and connected to the rear end of the first chain stay and also to the lower end of the first seat stay, the second fork end element being arranged on another side of the rear wheel and connected to the rear end of the second chain stay and also to the lower end of the second seat stay.

The bicycle frame assembly further includes a rocker arm element having a first and a second ends and arranged between the upper ends of the seat stays and the second region of the main frame section, a first pivot means arranged in the first region of the main frame section, for connecting the first and second chain stays to the main frame section, and for allowing a pivotal motion between the first and second chain stays and the main frame about a first transverse axis, a second pivot means arranged between the first chain stay and the first seat stay, and between the second chain stay and the second seat stay, for allowing a pivotal motion between the first and second seat stays and the first and second chain stays about a second transverse axis, a third pivot means arranged between the upper ends of the first and second seat stays and the first end of the rocker arm element, for allowing a pivotal motion between the rocker arm element and the first and second seat stays about a third transverse axis, a fourth pivot means arranged between the second end of the rocker arm element and the second region of the main frame section, for allowing a pivotal motion between the rocker arm element and the main frame section about a fourth transverse axis, and a shock absorbing device arranged between the rocker arm element and the main frame section in a third region, the shock absorbing device being operative as a distance between the rocker arm element and the main frame section changes when the frame assembly is in use, for absorbing shocks transmitted from the rear wheel to the main frame section.

In the bicycle frame assembly according to the present invention, the chain stays, the seat stays and the rocker arm element are combined with each other to constitute a rear frame section. The rear frame section is connected to the main frame section as a four-link mechanism which is movable within a vertical plane including the main frame section. The rear frame section is positively connected to the main frame section at two points, i.e. at the ends of the chain stays and also at the end of the rocker arm element, to achieve a satisfactory transverse rigidity of the entire frame assembly for minimizing bending or twisting deformation when the bicycle is in use.

Advantageously, the shock absorbing device of the frame assembly comprises a coil spring, a hollow inner cylindrical member surrounding the coil spring and composed of a rubbery elastomer, and a pair of outer cylindrical members surrounding the inner cylindrical member and connected to respective axial ends of the inner cylindrical member and relatively slidably fitted with each other. The shock absorbing device of such an arrangement is particularly effective under both light and heavy load conditions and is simple in structure, light in weight, less costly and maintenance-free.

BRIEF DESCRIPTION OF THE DRAWINGS

The present invention will now be explained in further detail with reference to some specific embodiments show in the accompanying drawings, in which.

DETAILED DESCRIPTION OF THE PREFERRED EMBODIMENTS

One embodiment of the bicycle frame assembly according to the present invention is shown in FIGS. 1 to 5, and includes a main frame section 1 which is composed of a head tube 2, a top tube 3, a down tube 4, a seat tube 5 and a bottom bracket 6. The top tube 3 and the down tube 4 are welded to the head tube 2 at their front ends. The top tube 3 is welded to the seat tube 5 at its rear end. The down tube 4 at its rear end and the seat tube 5 at its lower end are welded to the bottom bracket 6. The frame assembly further includes a rear frame section 7 which is composed of pairs of chain stays 8, fork end elements 9 and seat stays 10. The fork end elements 9 are welded to the respective rear ends of the chain stays 8, and serve to mount and support a rear wheel 11.

Figure 1:
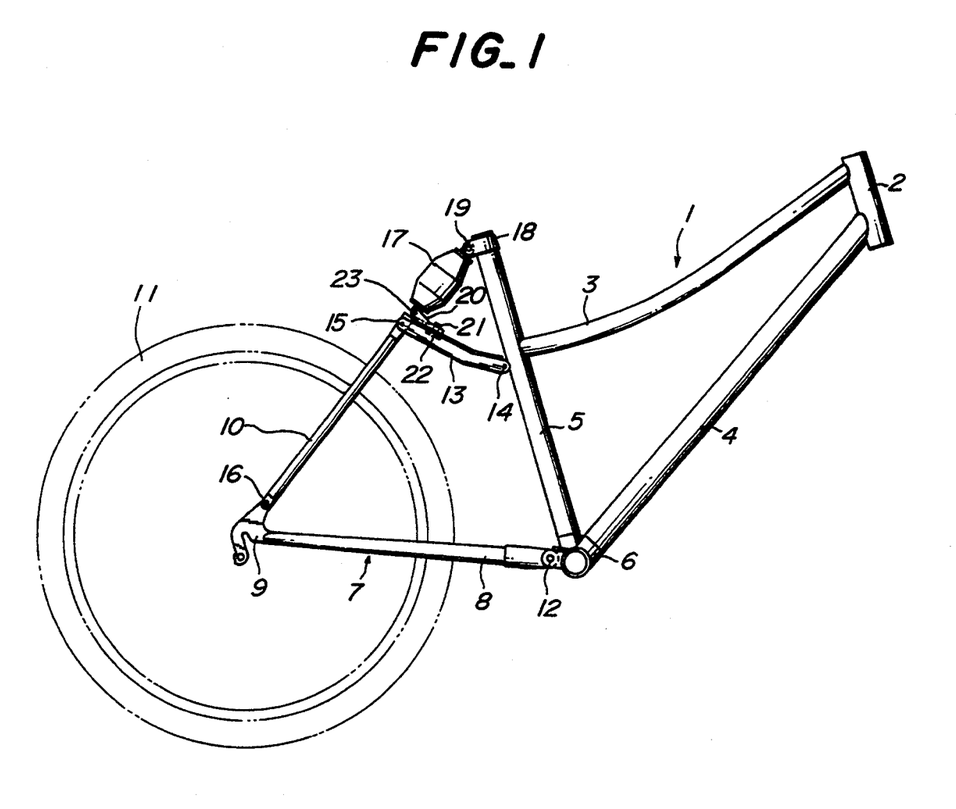
FIG. 1 is a side view showing the bicycle frame assembly according to one embodiment of the present invention.
Figure 2:
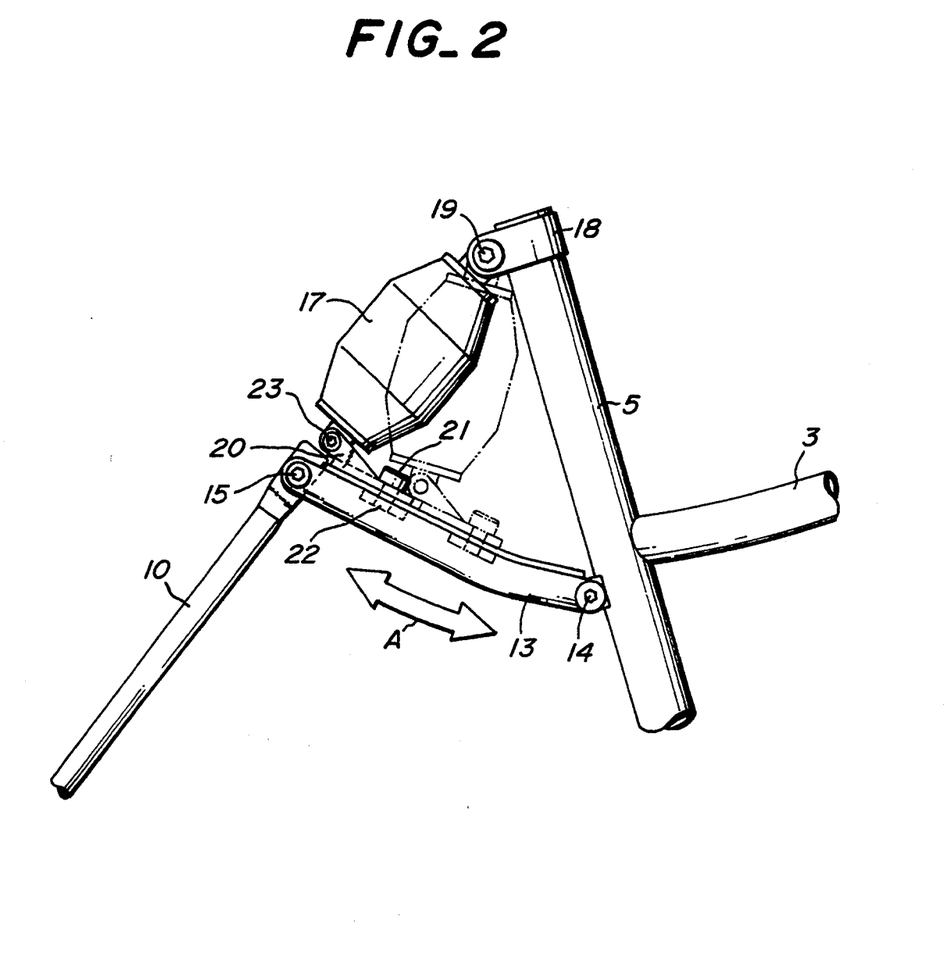
FIG. 2 is a fragmentary side view, in an enlarged scale, showing the rocker arm element and the shock absorbing device.

The front ends of the chain stays 8 are pivotally connected to the main frame section 1 in its region adjacent to the bottom bracket 6, by means of a transverse pivot connection 12. A rocker arm element 13 is arranged above the chain stays 8, between the main frame section 1 and the seat stays 10. The rocker arm element 13 extends substantially in parallel with the chain stays 8. The rocker arm element 13 has a front end pivotally connected to the main frame section 1 in its region adjacent to the top tube 3 by means of a transverse pivot connection 14, and a rear end pivotally connected to the upper ends of the seat stays 10 by means of a transverse pivot connection 15. The seat stays 10 at their lower ends are pivotally connected to the fork end elements 9 by means of a transverse pivot connection 16. Thus, the seat tube 5, the chain stays 8, the seat stays 10 and the rocker arm element 13 are combined with each other to form a four-link mechanism which is oscillatable in a vertical plane which includes the main frame section 1.

A shock absorbing device 17 is arranged between the rocker arm element 13 and the top region of the seat tube 5. As particularly shown in FIG. 2, the shock absorbing device 17 in this embodiment comprises a rubbery elastomer, such as a foamed polyurethane rubber with a desired flexibility and hardness, which is formed into a substantially pineapple-shaped body. A connector ring 18 is arranged to surround the top region of the seat tube 5, and cooperates with a transverse pivot connection 19 so as to connect the upper end of the shock absorbing device 17 to the main frame section 1. Another connection piece 20 is secured to the rocker arm element 13 by a bolt 21 and a nut 22, to which the lower end of the shock absorbing device 17 is connected by a transverse pivot connection 23.

Figure 3:
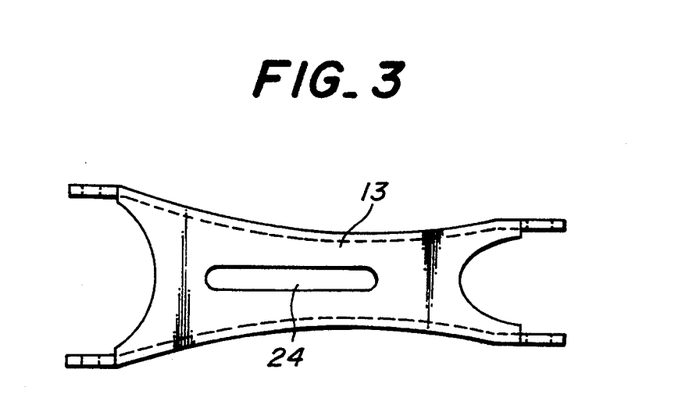
FIG. 3 is a plan view showing one example of the rocker arm element.

As shown in FIG. 3, the rocker arm element 13 is advantageously formed with an elongate connection hole 24 in the form of a slit which extends in the fore-and-aft direction of the frame assembly 1, indicated by an arrow A. The bolt 21 is passed through the hole 24 so that the position of the connection piece 20 and hence that of the lower end of the shock absorbing device 17 can be longitudinally adjusted, as shown by imaginary line in FIG. 2, to thereby achieve a desired optimum shock absorbing performance.

More particularly, the apparent spring constant of the shock absorbing device 17 can be adjusted by changing the longitudinal position of its lower end. When the shock absorbing device 17 assumes a rear side position indicated by solid line in FIG. 2, the apparent spring constant is relatively high. When the shock absorbing device 17 assumes a front side position indicated by imaginary line in FIG. 2, the apparent spring constant is relatively low.

Figure 4:
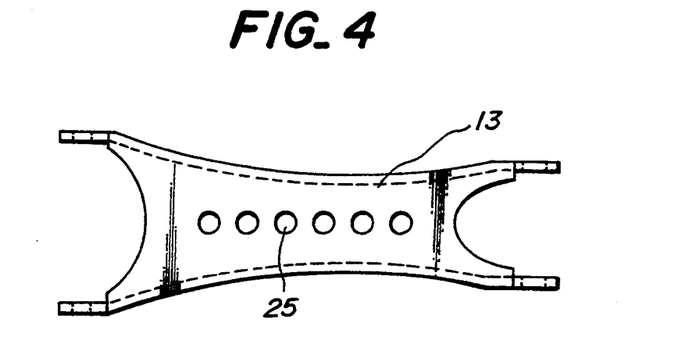
FIG. 4 a plan view showing another example of the rocker arm element.

As an alternative example, the rocker arm element 13 may be formed with a plurality of connection holes 25 as shown in FIG. 4, forming a row which extends in the fore-and-aft direction A of the frame assembly 1. In this case, the bolt 21 is passed through a selected one of the holes 25 to obtain a similar adjustability of the apparent spring constant of the shock absorbing device 17.

Figure 5:
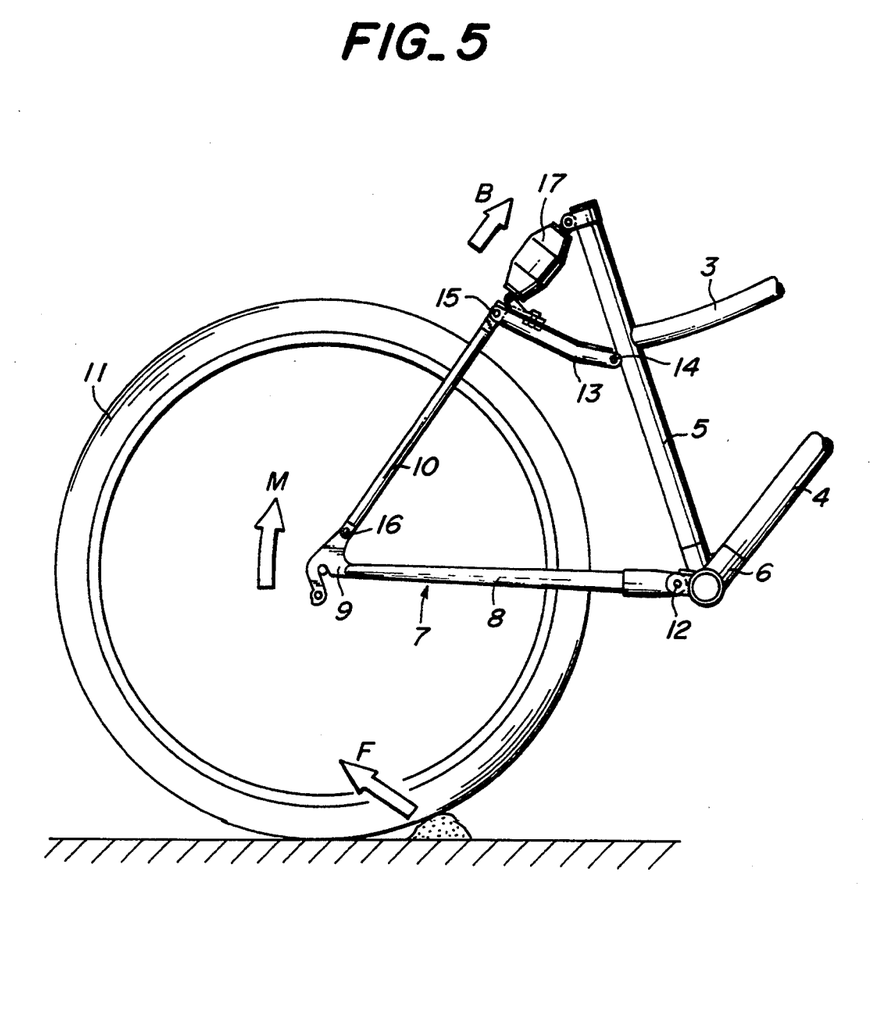
FIG. 5 is a side view explaining the shock absorbing function of the bicycle frame assembly of FIG. 1.

In actual use condition of the bicycle which incorporates the frame assembly according to the embodiment of FIG. 1, when the rear wheel 11 rides over a bump, for example, and the rear frame section 7 is subjected to a shock as shown in FIG. 5, the rear wheel 11 is applied with an upward force F so that a moment M is generated causing the rear frame section 7 to undergo a swing motion about the pivot connection 12. During this swing motion of the rear frame section 7, the shock absorbing device 17 is applied with a compression force as shown by arrow B and thereby deformed or compressed while absorbing the energy of the shock. It is thus possible to prevent effectively the shock from being directly transmitted to the cyclist via the main frame section 1 of the bicycle. Besides, the shock absorbing device 17 comprising a rubbery elastomer provides an adequate damping function for realizing a stabilized riding comfort. Furthermore, the frame assembly exhibits a sufficiently high twisting rigidity since, in addition to the pivot connection 12 at the front ends of the chain stays 8, the pivot connection 14 at the front end of the rocker arm element 13 also serves to support the twisting moment which is repeatedly applied to the frame assembly in use.

Figure 6:
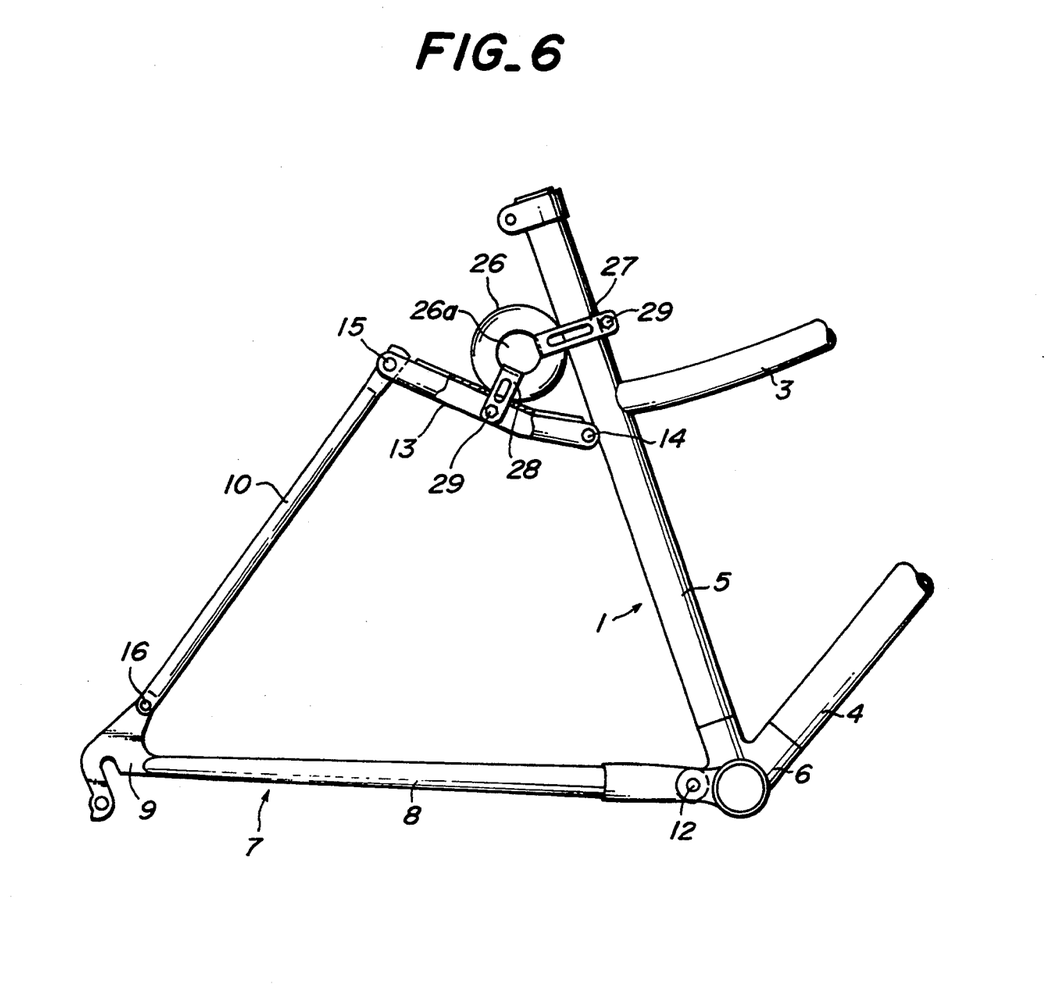
FIG. 6 is a fragmentary side view showing the bicycle frame assembly according to another embodiment of the present invention.
Figure 7:
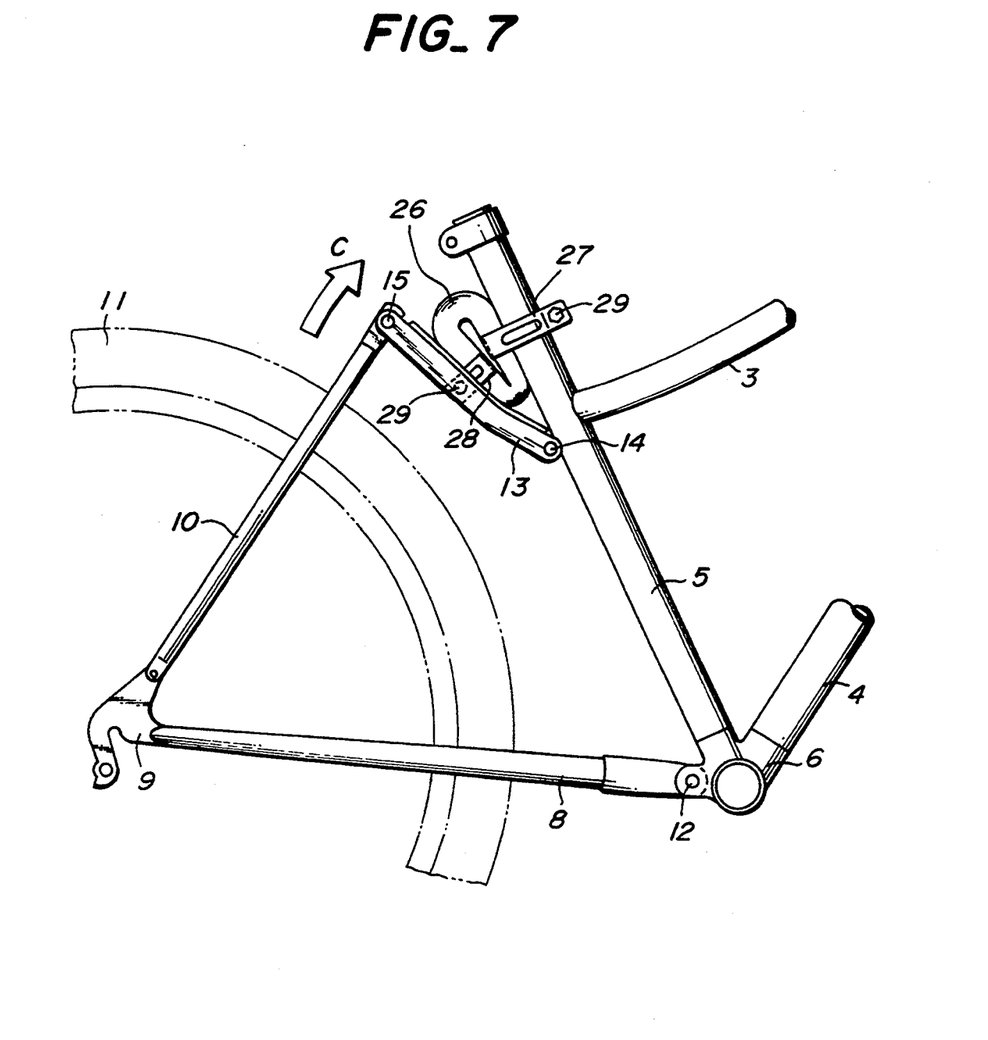
FIG. 7 is a side view explaining the shock absorbing function of the bicycle frame assembly of FIG. 6 in its heavy load condition.

Another embodiment of the bicycle frame assembly according to the present invention is shown in FIGS. 6 and 7, and includes a shock absorbing device 26 which is an annular resilient member comprising a rubbery elastomer, such as a hard-type polyurethane rubber. The resilient member 26 has an opening 26a with a center axis which is oriented perpendicularly to the vertical plane including the main frame section 1. The resilient member 26 is arranged between, and secured to the seat tube 5 and the rocker arm element 13 by band elements 27, 28 and fixing bolts 29.

The resilient member 26 of this embodiment serves to absorb effectively shocks for a wide range of the load condition, by providing a relatively low apparent spring constant for a relatively light load condition, and a relatively high apparent spring constant for a relatively high load condition. More particularly, when the rear frame section 7 is applied with a shock and the rear frame section 7 undergoes a swing motion about the pivot connection 12, the resilient member 26 in the initial phase is deformed until diametrically opposite regions of the resilient member 26 on both sides of the opening 26a are brought into contact each other, as shown by arrow C in FIG. 7. Furthermore, in the case of a relatively heavy load condition, the resilient member 26 subsequently undergoes a secondary phase deformation in which the resilient member 26 is further compressed, with the diametrically opposite regions urged against each other, thereby providing a higher apparent spring constant.

Figure 8:
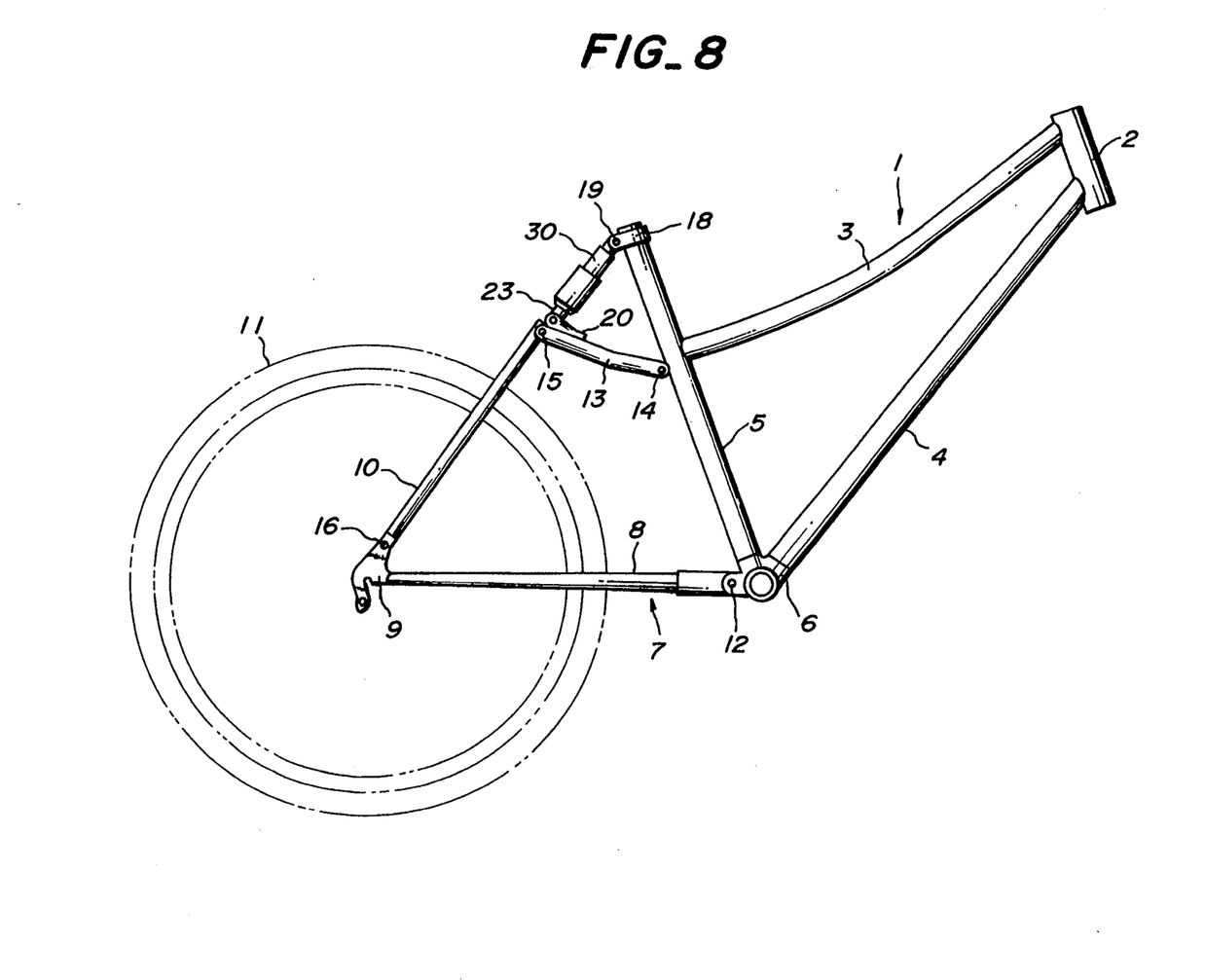
FIG. 8 is a fragmentary side view showing the bicycle frame assembly according to still another embodiment of the present invention.
Figure 9:
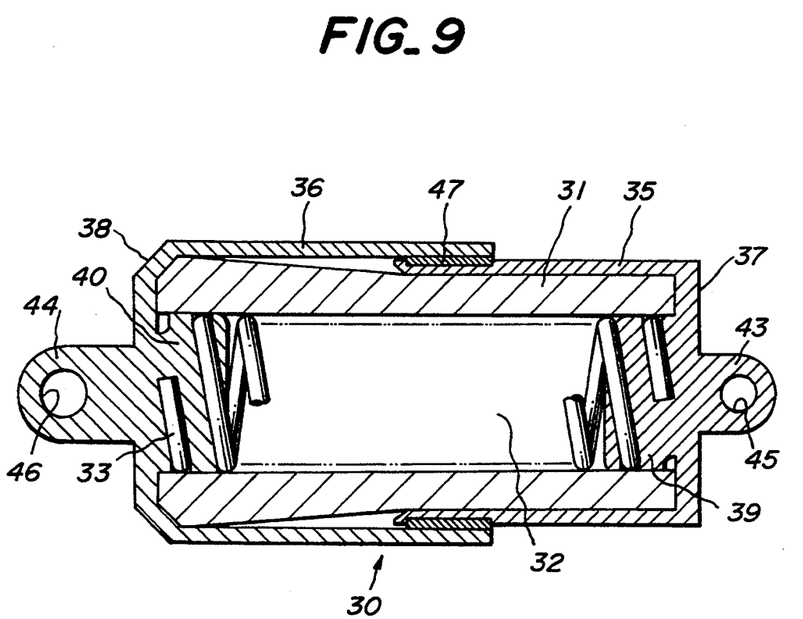
FIG. 9 is a longitudinal-sectional view of the shock absorbing device incorporated in the frame assembly of FIG. 8.
Figure 10:
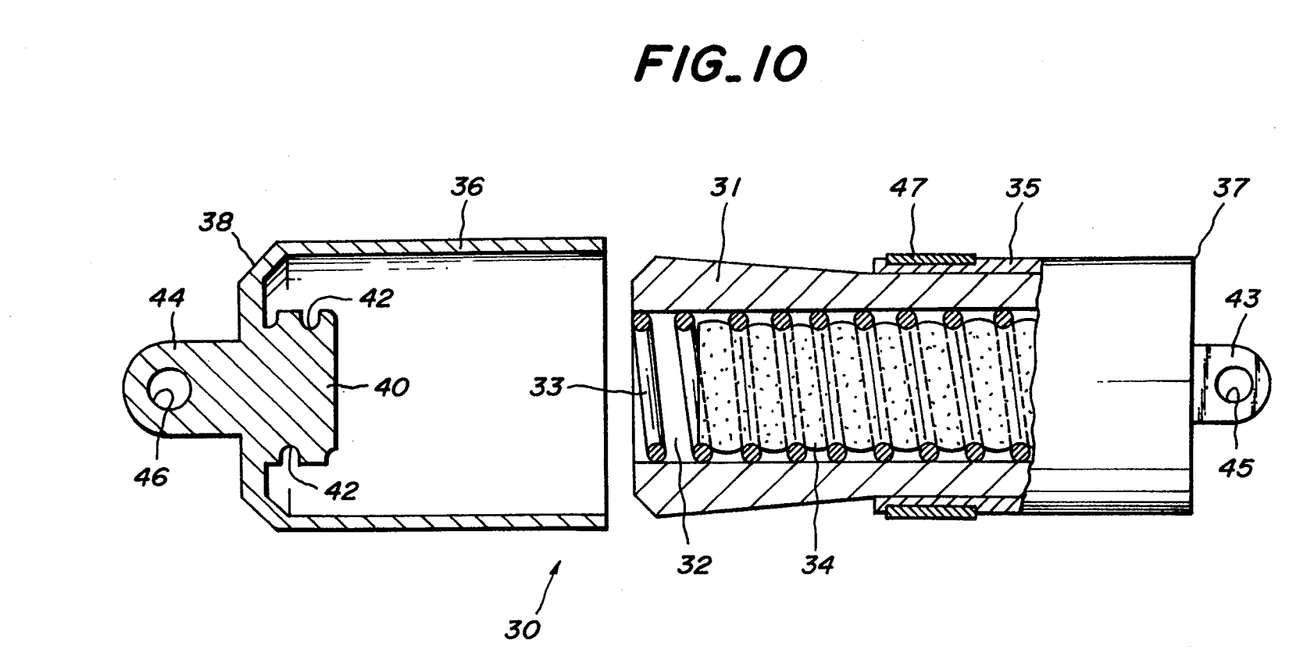
FIG. 10 is a sectional view of the shock absorbing device of FIG. 9, showing one outer cylindrical member removed.

Still another embodiment of the bicycle frame assembly according to the present invention is shown in FIGS. 8 to 10, and featured by a shock absorbing device 30 which will be explained below. The shock absorbing device 30 of this embodiment includes a hollow inner cylindrical member 31 composed of a rubbery elastomer, such as a foamed polyurethane rubber, and having an inner space 32 in which a compression coil spring 33 is press-fitted. As shown in FIG. 10, a rod-like resilient member 34 also composed of a rubbery elastomer, such as a foamed polyurethane rubber, is arranged within the coil spring 33. The resilient member 34 may be either press-fitted into the coil spring 33, or may be formed integrally with the coil spring 33 by an insert-injection process, for example. Furthermore, a pair of outer cylindrical members 35, 36 are relatively slidably fitted with each other, and surround the inner cylindrical member 31.

Preferably, the foamed polyurethane rubber to be used as the inner cylindrical member 31 and/or the resilient member 34 has a density which is approximately within a range of 0.4 to 0.7 g/cm$^3$.

The outer cylindrical members 35, 36 are each provided with a flange-like end portion 37, 38 and a stud-like spring seat portion 39, 40 on axially inner side thereof. The end portions 37, 38 serve to support axially the respective end portions of the inner cylindrical member 31, and the spring seat portions 39, 40 are in engagement with the respective end portions of the coil spring 33. The spring seat portions 39, 40 may be formed with helical grooves 41, 42 on their outer peripheral surfaces, for engaging the end portions of the coil spring 33 therein. Each outer cylindrical member 35, 36 is further provided with a mount portion 43, 44 with a transverse bore 45, 46 for passing a shaft therethrough as the pivot connection 19, 23. The outer cylindrical member 35 which is arranged in a radially inner side of the outer cylindrical member 36 has a free end whose outer surface may be provided with a bearing sleeve 47 comprising a low friction material, such as polytetrafluoroethylene (PTFE).

In one practical example, the outer cylindrical member 35 to be arranged on radially inner side has an inner diameter of 40 mm and an axial length of 50 mm. The outer cylindrical member 36 to be arranged on radially outer side has an inner diameter of 45 mm and an axial length of 60 mm. The inner cylindrical member 31 has a first outer surface region on the side of the outer cylindrical member 35, with a diameter which conforms with the inner diameter of the outer cylindrical member 35, and a second outer surface region on the side of the outer cylindrical member 36, with a diameter which is gradually increased toward the flange-like end portion 38. The space 32 within the inner cylindrical member 31 has an inner diameter of 25 mm. The coil spring 33 has an outer diameter which is slightly greater than 25 mm in its free state. The spring seat portions 39, 40 have an outer diameter which is also 25 mm.

In operation, when the shock absorbing device 30 is applied with a compression force, the inner cylindrical member 31 and the coil spring 33 are axially compressed, while gradually increasing the internal pressure of the cylindrical member 31. Thus, the shock absorbing device 30 exhibits a relatively low spring constant in a light load condition, and relatively high spring constant in a heavy load condition.

Figure 11:
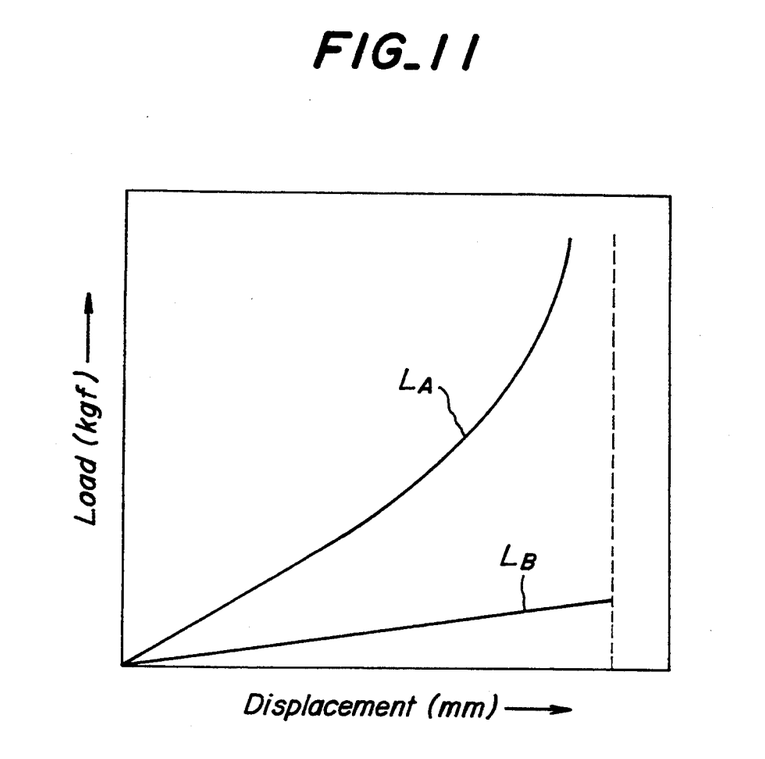
FIG. 11 is a graph showing the load-displacement characteristic of the shock absorbing device of FIG. 9.

FIG. 11 shows the load-displacement characteristic $L_A$ of the shock absorbing device 30 shown in FIGS. 9 and 10, wherein the foamed polyurethane rubber used as the inner cylindrical member 31 and the resilient member 34 has a specific weight of 0.55. The curve $L_B$ corresponds to the characteristic of the coil spring 33 alone, so that the difference between the curves $L_A$ and $L_B$ is the contribution of the foamed polyurethane rubber as the inner cylindrical member 31 and the resilient member 34.

Figure 12:
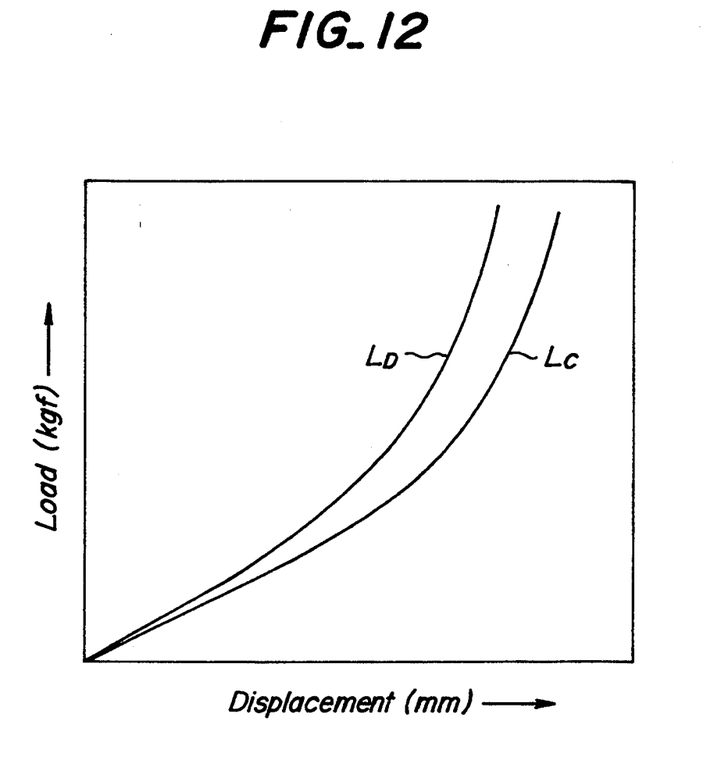
FIG. 12 is a graph showing the load-displacement characteristics which can be achieved by adjusting the density of the rubbery elastomer forming the inner cylindrical member in the shock absorbing device of FIG. 9.

FIG. 12 shows the load-displacement characteristic of the shock absorbing device 30 shown in FIGS. 9 and 10, which is not provided with the resilient member 34. The curve $L_C$ corresponds to the inner cylindrical member 31 comprising a foamed polyurethane rubber with a specific weight of 0.55, and the curve $L_B$ corresponds to the inner cylindrical member 31 comprising a foamed polyurethane rubber with a specific weight of 0.6. It is clear that the spring constant of the shock absorbing device 30 becomes higher as the specific weight of the foamed polyurethane rubber for the inner cylindrical member 31 increases.

The shock absorbing device 30 described above is particularly advantageous in that it is effective under both light and heavy load conditions and is yet simple and compact in structure, light in weight, less costly and maintenance-free. A unique feature of the shock absorbing device 30 is the capability of adjusting the spring constant in a facilitated manner, by appropriately selecting the various parameters of the rubbery elastomer. Further, the coil spring 33 combined with the inner cylindrical member 31 generates a restoring force which serves to cancel any deviation in the free-state length of the device 30 due to the hysteresis of the rubbery elastomer. Moreover, the outer cylindrical members 35, 36 serve to properly guide the compressive deformation of the inner cylindrical member 31 to provide a stable characteristic even when the device 30 is applied with a one-sided load.

It will be readily appreciated from the foregoing detailed description that the present invention provides an improved bicycle frame assembly including a novel shock absorbing system associated with a rear wheel, which is essentially free from various drawbacks of the prior art.

While the present invention has been so far explained with reference to certain preferred embodiments, it is of course that they were presented by way of examples only to show the manner how the invention may be carried out into practice, and various modifications and/or alterations may be made without departing from the scope of the invention as particularly defined in the appended claims.

We claim:

1. A bicycle frame assembly including a shock absorbing system associated with a rear wheel, comprising:

a main frame section;

first and second chain stays each having a front end and a rear end, said front end being associated with said main frame section in a first region;

first and second seat stays each having an upper end and a lower end, said upper end being associated with said main frame section in a second region above said first region;

first and second fork end elements for mounting and supporting the rear wheel, said first fork end element being arranged on one side of the rear wheel and connected to said rear end of said first chain stay and also to said lower end of said first seat stay, said second fork end element being arranged on another side of the rear wheel and connected to said rear end of said second chain stay and also to said lower end of said second seat stay;

a rocker arm element having first and second ends, said rocker arm element being arranged between said upper ends of the seat stays and said second region of the main frame section;

a first pivot means arranged in said first region of the main frame section, for connecting said first and second chain stays to said main frame section, and for allowing a pivotal motion between said first and second chain stays and said main frame about a first transverse axis;

a second pivot means arranged between said first chain stay and said first seat stay, and between said second chain stay and said second seat stay, for allowing a pivotal motion between said first and second seat stays and said first and second chain stays about a second transverse axis;

a third pivot means arranged between said upper ends of the first and second seat stays and said first end of the rocker arm element, for allowing a pivotal motion between said rocker arm element and said first and second seat stays about a third transverse axis;

a fourth pivot means arranged between said second end of the rocker arm element and said second region of the main frame section, for allowing a pivotal motion between said rocker arm element and said main frame section about a fourth transverse axis; and a shock absorbing device arranged above said rocker arm element so as to extend upwardly from said rocker arm element to said main frame section in a third region, said shock absorbing device being operative as a distance between the rocker arm element and the main frame section changes when the frame assembly is in use, for absorbing shocks transmitted from the rear wheel to the main frame section, said shock absorbing device comprising a coil spring, a hollow inner cylindrical member surrounding said coil spring, said inner cylindrical member being composed of a rubbery elastomer and having first and second axial ends, and first and second outer cylindrical members surrounding said inner cylindrical member, a first end of said first outer cylindrical member and a first end of said second outer cylindrical member being connected to said first and second axial ends of the inner cylindrical member, respectively, the first and second outer cylindrical members being relatively slidably fitted with each other, wherein said first and second outer cylindrical members each comprises a flange-like end portion and a stud-like spring seat portion on an axially inner side of the end portion, said spring seat portion being in engagement with said coil spring.

2. The frame assembly as set forth in claim 1, wherein said spring seat portion has an outer peripheral surface which is formed with a helical groove, said coil spring having one end which is engaged in said groove.

3. The frame assembly as set forth in claim 1, further comprising a fifth pivot means arranged between said rocker arm element and one of said first and second outer cylindrical members, for allowing a pivotal motion between said rocker arm element and said shock absorbing device about a fifth transverse axis, and a sixth pivot means arranged between the other of said first and second outer cylindrical members and said third region of the main frame section, for allowing a pivotal motion between said shock absorbing device and said main frame section about a sixth transverse axis.

4. The frame assembly as set forth in claim 3, wherein said first outer cylindrical member further comprises a first mount portion on an axially outer side of the first flange-like end portion, said first mount portion forming part of said fifth pivot means, and wherein said second outer cylindrical member further comprises a second mount portion on an axially outer side of the second flange-like end portion, said second mount portion forming part of said sixth pivot means.

5. The frame assembly as set forth in claim 1, wherein said inner cylindrical member is composed of a foamed polyurethane rubber.

6. The frame assembly as set forth in claim 5, wherein said foamed polyurethane rubber has a density which is approximately within a range of 0.4 to 0.7 g/cm$^3$.

7. The frame assembly as set forth in claim 1, wherein said first end of the inner cylindrical member has an outer diameter which is substantially equal to an inner diameter of said first outer cylindrical member, and said second end of the inner cylindrical member has an outer diameter which is substantially equal to an inner diameter of said second outer cylindrical member.

8. The frame assembly as set forth in claim 7, wherein said inner cylindrical member has an outer diameter which gradually changes at least locally between said first and second ends.

9. The frame assembly as set forth in claim 1, wherein said first and second outer cylindrical members have free ends which are remote from said first end of the first outer cylindrical member and said first end of the second outer cylindrical member, respectively, and wherein said free end of one of said first and second outer cylindrical members, which is arranged radially within the other, has an inner guide surface for facilitating insertion of said inner cylindrical member within said one of said first and second outer cylindrical members.

10. The frame assembly as set forth in claim 1, further comprising a rod-like resilient member arranged in, and surrounded by said coil spring.

11. The frame assembly as set forth in claim 10, wherein said resilient member is formed integrally with said coil spring.

12. The frame assembly as set forth in claim 1, wherein said shock absorbing device is secured to said rocker arm element at an adjustable position for changing an apparent spring constant of said shock absorbing device.

13. The frame assembly as set forth in claim 12, wherein said rocker arm element has a plurality of connection holes to be selectively engaged by said shock absorbing device.

14. The frame assembly as set forth in claim 12, wherein said rocker arm element has an elongate connection hole to be adjustably engaged by said shock absorbing device.

15. A bicycle frame assembly including a shock absorbing system associated with a rear wheel, comprising:
a main frame section;
first and second chain stays each having a front end and a rear end, said front end being associated with said main frame section in a first region;
first and second seat stays each having an upper end and a lower end, said upper end being associated with said main frame section in a second region above said first region;
first and second fork end elements for mounting and supporting the rear wheel, said first fork end element being arranged on one side of the rear wheel and connected to said rear end of said first chain stay and also to said lower end of said first seat stay, said second fork end element being arranged on another side of the rear wheel and connected to said rear end of said second chain stay and also to said lower end of said second seat stay;
a rocker arm element having first and second ends, said rocker arm element being arranged between said upper ends of the seat stays and said second region of the main frame section;
a first pivot means arranged in said first region of the main frame section, for connecting said first and second chain stays to said main frame section, and for allowing a pivotal motion between said first and second chain stays and said main frame about a first transverse axis;
a second pivot means arranged between said first chain stay and said first seat stay, and between said second chain stay and said second seat stay, for allowing a pivotal motion between said first and second seat stays and said first and second chain stays about a second transverse axis;
a third pivot means arranged between said upper ends of the first and second seat stays and said first end of the rocker arm element, for allowing a pivotal motion between said rocker arm element and said first and second seat stays about a third transverse axis;
a fourth pivot means arranged between said second end of the rocker arm element and said second region of the main frame section, for allowing a pivotal motion between said rocker arm element and said main frame section about a fourth transverse axis; and
a shock absorbing device arranged above said rocker arm element so as to extend upwardly from said rocker arm element to said main frame section in a third region, said shock absorbing device being operative as a distance between the rocker arm element and the main frame section changes when the frame assembly is in use, for absorbing shocks transmitted from the rear wheel to the main frame section, said shock absorbing device comprising a coil spring, a hollow inner cylindrical member surrounding said coil spring, said inner cylindrical member being composed of a rubbery elastomer and having first and second axial ends, and first and second outer cylindrical members surrounding said inner cylindrical member, a first end of said first outer cylindrical member and a first end of said second outer cylindrical member being connected to said first and second axial ends of the inner cylindrical member, respectively, the first and second outer cylindrical members being relatively slidably fitted with each other, wherein said first end of the inner cylindrical member has an outer diameter which is substantially equal to an inner diameter of said first outer cylindrical member, and said second end of the inner cylindrical member has an outer diameter which is substantially equal to an inner diameter of said second outer cylindrical member.

16. The frame assembly as set forth in claim 15, further comprising a fifth pivot means arranged between said rocker arm element and one of said first and second outer cylindrical members, for allowing a pivotal motion between said rocker arm element and said shock absorbing device about a fifth transverse axis, and a sixth pivot means arranged between the other of said first and second outer cylindrical members and said third region of the main frame section, for allowing a pivotal motion between said shock absorbing device and said main frame section about a sixth transverse axis.

17. The frame assembly as set forth in claim 16, wherein said first outer cylindrical member comprises a first flange-like end portion, and a first mount portion on an axially outer side of the first flange-like end portion, said first mount portion forming part of said fifth pivot means, and wherein said second outer cylindrical member comprises a second flange-like end portion, and a second mount portion on an axially outer side of the second flange-like end portion, said second mount portion forming part of said sixth pivot means.

18. The frame assembly as set forth in claim 15, wherein said inner cylindrical member is composed of a foamed polyurethane rubber.

19. The frame assembly as set forth in claim 18, wherein said foamed polyurethane rubber has a density which is approximately within a range of 0.4 to 0.7 g/cm$^3$.

20. The frame assembly as set forth in claim 15, wherein said inner cylindrical member has an outer diameter which gradually changes at least locally between said first and second ends.

21. The frame assembly as set forth in claim 15, wherein said first and second outer cylindrical members have free ends which are remote from said first end of the first outer cylindrical member and said first end of the second outer cylindrical member, respectively, and wherein said free end of one of said first and second outer cylindrical members, which is arranged radially within the other, has an inner guide surface for facilitating insertion of said inner cylindrical member within said one of said first and second outer cylindrical members.

22. The frame assembly as set forth in claim 15, further comprising a rod-like resilient member arranged in, and surrounded by said coil spring.

23. The frame assembly as set forth in claim 22, wherein said resilient member is formed integrally with said coil spring.

24. The frame assembly as set forth in claim 15, wherein said shock absorbing device is secured to said rocker arm element at an adjustable position for changing an apparent spring constant of said shock absorbing device.

25. The frame assembly as set forth in claim 24, wherein said rocker arm element has a plurality of connection holes to be selectively engaged by said shock absorbing device.

26. The frame assembly as set forth in claim 24, wherein said rocker arm element has an elongate connection hole to be adjustably engaged by said shock absorbing device.

27. A bicycle frame assembly including a shock absorbing system associated with a rear wheel, comprising:
 a main frame section;
 first and second chain stays each having a front end and a rear end, said front end being associated with said main frame section in a first region;
 first and second seat stays each having an upper end and a lower end, said upper end being associated with said main frame section in a second region above said first region;
 first and second fork end elements for mounting and supporting the rear wheel, said first fork end element being arranged on one side of the rear wheel and connected to said rear end of said first chain stay and also to said lower end of said first seat stay, said second fork end element being arranged on another side of the rear wheel and connected to said rear end of said second chain stay and also to said lower end of said second seat stay;
 a rocker arm element having first and second ends, said rocker arm element being arranged between said upper ends of the seat stays and said second region of the main frame section;
 a first pivot means arranged in said first region of the main frame section, for connecting said first and second chain stays to said main frame section, and for allowing a pivotal motion between said first and second chain stays and said main frame about a first transverse axis;
 a second pivot means arranged between said first chain stay and said first seat stay, and between said second chain stay and said second seat stay, for allowing a pivotal motion between said first and second seat stays and said first and second chain stays about a second transverse axis;
 a third pivot means arranged between said upper ends of the first and second seat stays and said first end of the rocker arm element, for allowing a pivotal motion between said rocker arm element and said first and second seat stays about a third transverse axis;
 a fourth pivot means arranged between said second end of the rocker arm element and said second region of the main frame section, for allowing a pivotal motion between said rocker arm element and said main frame section about a fourth transverse axis; and a shock absorbing device arranged above said rocker arm element so as to extend upwardly from said rocker arm element to said main frame section in a third region, said shock absorbing device being operative as a distance between the rocker arm element and the main frame section changes when the frame assembly is in use, for absorbing shocks transmitted from the rear wheel to the main frame section, said shock absorbing device comprising a coil spring, a rod-like resilient member arranged in and surrounded by said coil spring, a hollow inner cylindrical member surrounding said coil spring, said inner cylindrical member being composed of a rubbery elastomer and having first and second axial ends, and first and second outer cylindrical members surrounding said inner cylindrical member, a first end of said first outer cylindrical member and a first end of said second outer cylindrical member being connected to said first and second axial ends of the inner cylindrical member, respectively, the first and second outer cylindrical members being relatively slidably fitted with each other.

28. The frame assembly as set forth in claim 27, further comprising a fifth pivot means arranged between said rocker arm element and one of said first and second outer cylindrical members, for allowing a pivotal motion between said rocker arm element and said shock absorbing device about a fifth transverse axis, and a sixth pivot means arranged between the other of said first and second outer cylindrical members and said third region of the main frame section, for allowing a pivotal motion between said shock absorbing device and said main frame section about a sixth transverse axis.

29. The frame assembly as set forth in claim 28, wherein said first outer cylindrical member comprises a first flange-like end portion, and a first mount portion on an axially outer side of the first flange-like end portion, said first mount portion forming part of said fifth pivot means, and wherein said second outer cylindrical member comprises a second flange-like end portion, and a second mount portion on an axially outer side of the second flange-like end portion, said second mount portion forming part of said sixth pivot means.

30. The frame assembly as set forth in claim 27, wherein said inner cylindrical member is composed of a foamed polyurethane rubber.

31. The frame assembly as set forth in claim 30, wherein said foamed polyurethane rubber has a density which is approximately within a range of 0.4 to 0.7 g/cm$^3$.

32. The frame assembly as set forth in claim 27, wherein said first and second outer cylindrical members have free ends which are remote from said first end of the first outer cylindrical member and said first end of the second outer cylindrical member, respectively, and wherein said free end of one of said first and second outer cylindrical members, which is arranged radially within the other, has an inner guide surface for facilitating insertion of said inner cylindrical member within said one of said first and second outer cylindrical members.

33. The frame assembly as set forth in claim 27, wherein said resilient member is formed integrally with said coil spring.

34. The frame assembly as set forth in claim 27, wherein said shock absorbing device is secured to said rocker arm element at an adjustable position for changing an apparent spring constant of said shock absorbing device.

35. The frame assembly as set forth in claim 34, wherein said rocker arm element has a plurality of connection holes to be selectively engaged by said shock absorbing device.

36. The frame assembly as set forth in claim 34, wherein said rocker arm element has an elongate connection hole to be adjustably engaged by said shock absorbing device.

* * * * *